(12) United States Patent
Hampton

(10) Patent No.: US 8,129,652 B2
(45) Date of Patent: *Mar. 6, 2012

(54) WELDING STABILITY SYSTEM AND METHOD

(75) Inventor: Jay Hampton, Lenox, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1070 days.

This patent is subject to a terminal disclaimer.

(21) Appl. No.: 11/927,809

(22) Filed: Oct. 30, 2007

(65) Prior Publication Data

US 2009/0107960 A1 Apr. 30, 2009

(51) Int. Cl.
*B23K 10/00* (2006.01)

(52) U.S. Cl. .............. 219/74; 219/121.55; 219/137.31; 219/137.7; 219/137.2

(58) Field of Classification Search .......... 219/74, 219/121.55, 137.2, 137.31, 137.7, 137.71
See application file for complete search history.

(56) References Cited

U.S. PATENT DOCUMENTS

| | | | | |
|---|---|---|---|---|
| 5,283,418 A | * | 2/1994 | Bellows et al. | 219/130.01 |
| 5,510,596 A | * | 4/1996 | Xu et al. | 219/130.01 |
| 5,741,980 A | * | 4/1998 | Hill et al. | 73/861.04 |
| 5,811,055 A | * | 9/1998 | Geiger | 266/49 |
| 2004/0034608 A1 | | 2/2004 | de Miranda et al. | |
| 2005/0061367 A1 | * | 3/2005 | Barr et al. | 137/93 |
| 2009/0107959 A1 | * | 4/2009 | Khakhalev et al. | 219/74 |

FOREIGN PATENT DOCUMENTS

| CN | 2623398 Y | 7/2004 |
|---|---|---|
| JP | 58035071 A | 3/1983 |

* cited by examiner

*Primary Examiner* — Mark Paschall
(74) *Attorney, Agent, or Firm* — MacMillan, Sobanski & Todd, LLC

(57) ABSTRACT

A weld stability system for an arc welding apparatus and method of operation is disclosed. The weld stability system may comprise a shielding gas supply and a control assembly. The shielding gas supply may include a first source of gas, a second source of gas, a mixing chamber, a first valve selectively connecting the first source of gas to the mixing chamber, a second valve selectively connecting the second source of gas to the mixing chamber, and a shielding gas supply line configured to direct gas from the mixing chamber to a weld gun. The control assembly may include a controller operatively engaging the first and second valves, and at least one sensor configured to monitor a parameter of an arc welding process and communicate with the controller.

5 Claims, 2 Drawing Sheets

WELDING STABILITY SYSTEM AND METHOD

BACKGROUND OF INVENTION

The present invention relates generally to a welding stability system for arc welding.

Gas metal arc welding (GMAW), or metal inert gas (MIG) welding is an arc welding process where a wire and shielding (welding) gas are fed through a welding gun. The shielding gas is directed into the welding zone while an electric current is passed through the air (i.e., an arc) from the electrode to the work piece. The shielding gasses protect the weld from atmospheric contamination in order to improve the characteristics of the weld. Stability of the arc can be significantly affected by the type of shielding gasses used. As a result, specific mixtures of shielding gasses are commonly used to improve the weld quality. The gas mixtures are supplied in pre-mixed tanks or in bulk systems employing a gas mixer. In either case, the ratios of various gas components are fixed, and so are not adjustable during the welding process even though the amount of penetration, the spatter generation, and the physical appearance are some of the attributes affected by the shielding gas mixture selected. Moreover, instability of the arc at the start of the weld has a great affect on the entire weld since up to eighty percent of weld spatter may be generated at the time of arc start. These types of issues may also be a cause for concern in other types of arc welding, such as, for example, flux cored arc welding (FCAW), gas tungsten arc welding (GTAW), and plasma arc welding (PAW).

SUMMARY OF INVENTION

An embodiment contemplates a weld stability system for an arc welding apparatus. The weld stability system may include a shielding gas supply and a control assembly. The shielding gas supply may include a first source of gas having a first gas mixture, a second source of gas having a second gas mixture that is different than the first gas mixture, a mixing chamber, a first automatically controllable valve selectively connecting the first source of gas to the mixing chamber, a second automatically controllable valve selectively connecting the second source of gas to the mixing chamber, and a shielding gas supply line configured to direct gas from the mixing chamber to a weld gun. The control assembly may include a controller operatively engaging the first and second automatically controllable valves to control the actuation of the first and second automatically controllable valves, and a sensor configured to monitor a parameter of an arc welding process and communicate with the controller.

An embodiment contemplates an arc welding apparatus that may comprise a weld gun, an electric power source operatively engaging the welding gun, a wire feed unit operatively engaging the weld gun, a shielding gas supply and a control assembly. The shielding gas supply may include a first source of gas having a first gas mixture, a second source of gas having a second gas mixture that is different than the first gas mixture, a mixing chamber, a first automatically controllable valve selectively connecting the first source of gas to the mixing chamber, a second automatically controllable valve selectively connecting the second source of gas to the mixing chamber, and a shielding gas supply line configured to direct gas from the mixing chamber to the weld gun. The control assembly may include a controller operatively engaging the first and second automatically controllable valves to control the actuation of the first and second automatically controllable valves, and a sensor configured to monitor a parameter of an arc welding process and communicate with the controller, whereby the controller actuates the first and second automatically controllable valves in response to the monitored parameter.

An embodiment contemplates a method of controlling a mixture of arc shielding gas during an arc welding operation, the method comprising the steps of: actuating a first valve connected to a first source of gas to selectively allow gas to flow from the first source of gas into a mixing chamber and then into a weld gun; actuating a second valve connected to a second source of gas to selectively allow gas to flow from the second source of gas into the mixing chamber and then into the weld gun; conducting the arc welding operation; monitoring at least one weld parameter to detect arc instability; communicating the at least one weld parameter being monitored to a controller; and automatically actuating the first and second valves with the controller when arc instability is detected to adjust the gas flowing from the first source of gas and the second source of gas.

An advantage of an embodiment is that, by controlling the gas mixture in real time in relation to arc instability, the arc stability is improved. With improved arc stability, the amount of spatter and weld defects are reduced and resulting weld quality is improved.

DETAILED DESCRIPTION

Figure 1:
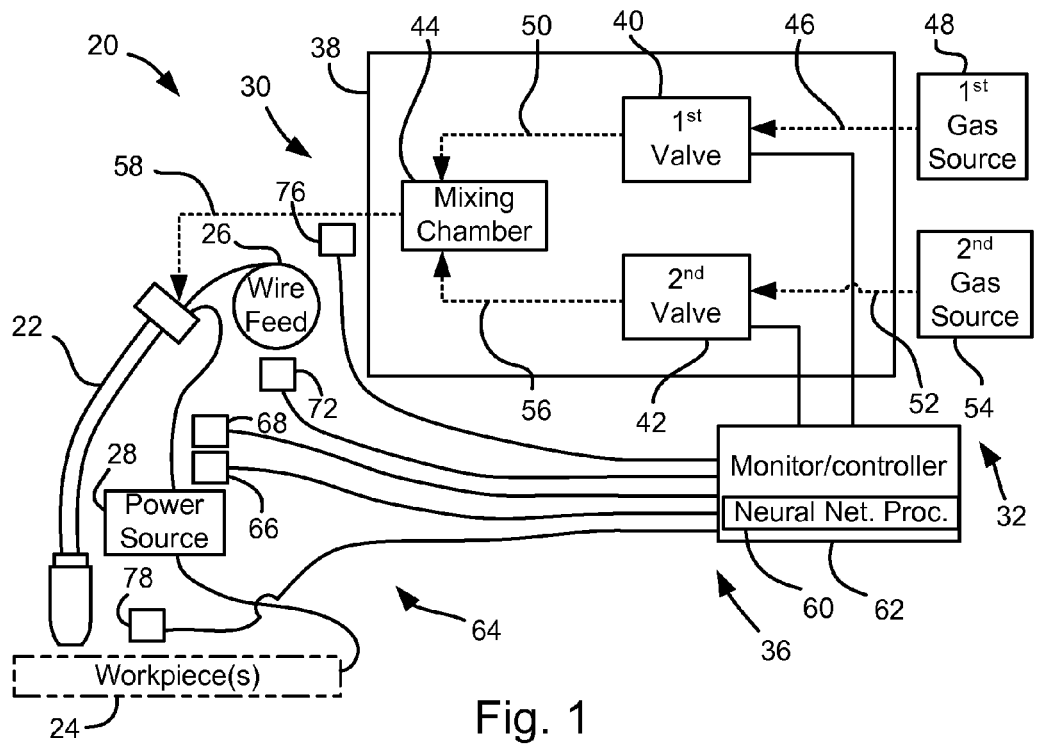
FIG. 1 is a schematic diagram of a portion of a welding system in accordance with a first embodiment.

Referring to FIG. 1, an arc welding apparatus, indicated generally at 20, is shown. The arc welding apparatus 20 includes a weld gun 22 that is employed to perform a welding process upon a workpiece(s) 24, a wire feed unit 26, an electric power source 28, a shielding gas supply assembly 30, and a welding stability system 32.

Figure 2:
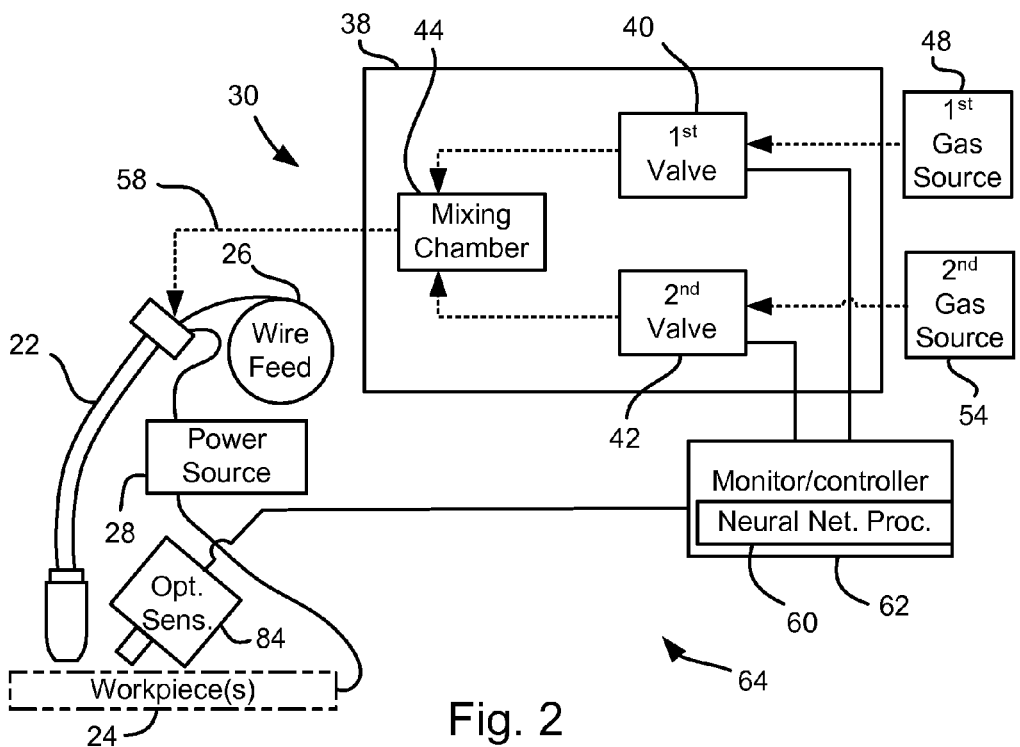
FIG. 2 is a schematic diagram similar to FIG. 1, but illustrating a second embodiment.

The welding stability system 32 includes the gas supply assembly 30 and a control assembly 36. The gas supply assembly 30 has a gas control unit 38 that includes a first valve 40, a second valve 42 and a mixing chamber 44. The first and second valves 40, 42 may be solenoid valves, servo valves or other suitable types of automatically controllable valves for controlling the flow of the shielding gasses. The first valve 40 connects to a gas input line 46 extending from a first source of gas 48 and an output line 50 leading to the mixing chamber 44. Gas lines are indicated in FIGS. 1 and 2 by dashed lines. The second valve 42 connects to a gas input line 52 extending from a second source of gas 54 and an output line 56 leading to the mixing chamber 44. A shielding gas supply line 58 extends from the mixing chamber 44 to the weld gun 22.

The first and second sources of gas 48, 54, of course, will have different types or mixtures of various gases. The particular gas mixture is determined by the welding application and the composition of the workpiece material. The gases may be, for example, nitrogen, oxygen, argon, helium, carbon dioxide, hydrogen, or mixtures of these gases. In addition, while only two valves 40, 42 and two gas sources 48, 54 are illustrated, three or more valves and gas sources may be employed instead, if so desired.

The control assembly 36 includes a monitor/controller 62, which may include a neural network processor 60 adapted to adjust in response to particular weld parameters being monitored. The controller 62 controls the actuation of the first and second valves 40, 42, thereby controlling the gas flow rate from and ratio between the first and second sources of gas 48, 54.

The control assembly 36 also includes a data acquisition portion 64. The data acquisition portion 64 includes various sensors in communication with the controller 62 for monitoring one or more parameters of the weld operation. For example, the data acquisition portion 64 may include a voltage sensor 66 and/or an amperage sensor 68 for measuring electrical characteristics of the power source 28 connected between the weld gun 22 and the workpiece(s) 24. Another sensor that may be employed is a wire feed speed sensor 72 that determines the rate of wire feed from the wire feed unit 26. Also, a gas flow rate sensor 76 may be employed to detect the flow rate of shield gas through the weld gun 22. A magnetic field strength sensor 78 also may be employed to detect a magnetic field strength near the weld location. These sensors can take any physical form desired and be located wherever needed for monitoring the particular characteristic in question, and, moreover, one or more may be employed in various combinations for detecting the particular weld characteristics one wishes to monitor.

FIG. 2 illustrates a second embodiment. Since the apparatus described in this embodiment is a modification of the first embodiment, like reference numbers designate corresponding parts in the drawings and, to avoid unnecessary repetition, detailed description thereof will be omitted. The gas supply assembly 30, weld gun 22, wire feed unit 26 and power source 28 may be the same as in the first embodiment. In this embodiment, however, the monitor/controller 62 interacts with a data acquisition portion 64 having an optical sensor 84. The optical sensor 84 monitors visual characteristics of the arc during the weld process, such as, for example, luminance, spatter, weld pool oscillation, gas flow turbulence and/or infrared emissions. The algorithms in the controller 62, then, relate to interpreting one or more of these visual characteristics and adjusting the valves 40, 42 in order to adjust the gas flow and gas mixture coming from the gas control unit 38. Again, a neural network processor 60 may be employed to provide weld adjustments to optimize the weld characteristics. The optical sensor 84 is positioned to view the area around the arc during welding operations and can be robot mounted (not shown) or fixed, depending upon the particular weld operations to be performed.

Alternatively, the optical sensor 84 can be used with one or more of the other sensors discussed in the first embodiment. And, as with the first embodiment, three or more gas supplies (and additional valves) may be employed, if so desired.

Figure 3:
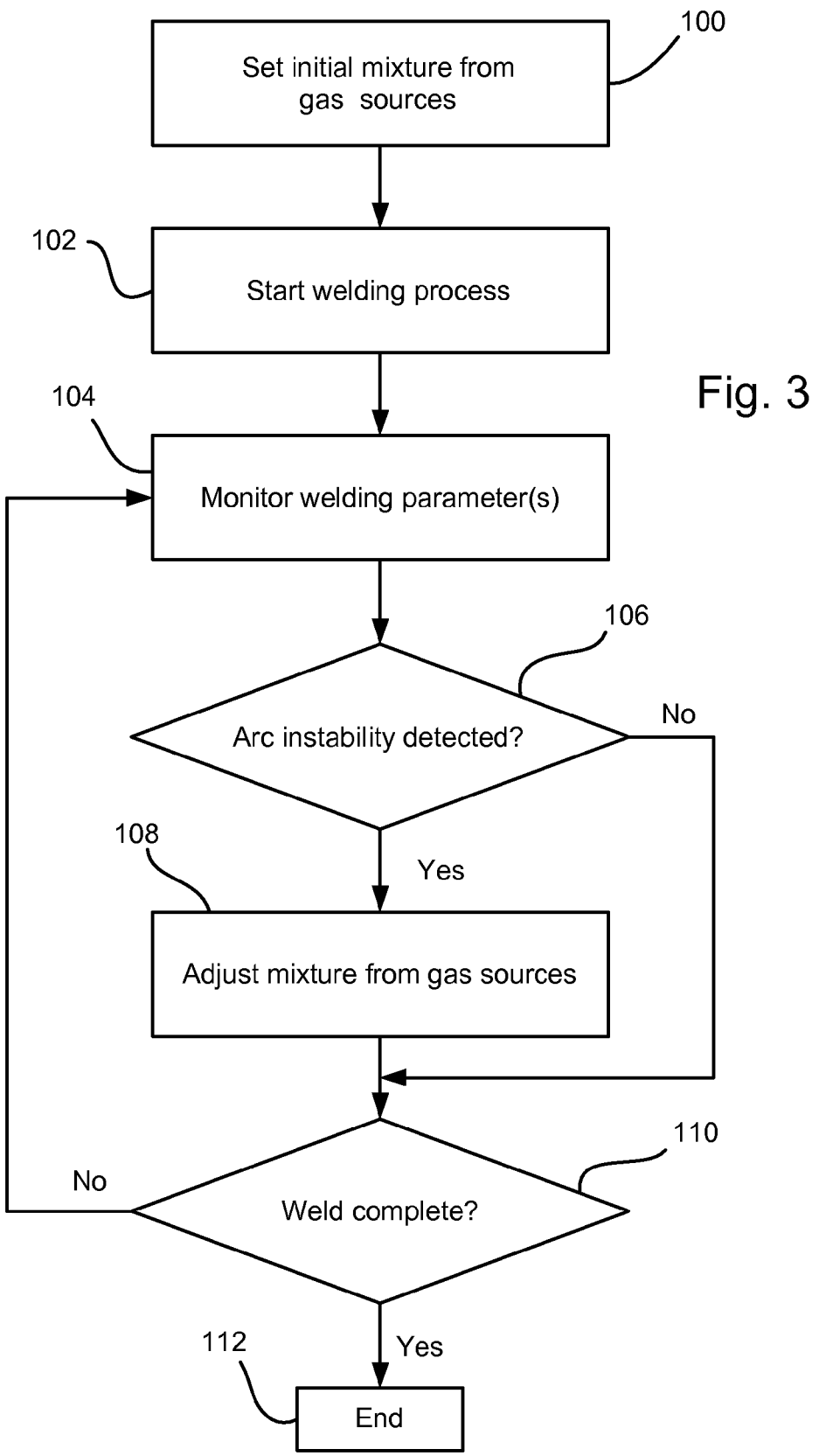
FIG. 3 is a flow chart illustrating a process for maintaining better arc stability.

FIG. 3 is a flow chart of the weld stability process, which is applicable to the assemblies of FIGS. 1 and 2. An initial mixture from the gas sources 48, 54 is set, block 100. The controller 62 determines the desired mixture and amount needed from each source 48, 54 to obtain this mixture. The welding process is started, block 102. The controller 62 actuates the valves 40, 42 to obtain the appropriate amount of gas from each source 48, 54. The gases mix in the mixing chamber 44 and are directed through the shielding gas supply line 58 into the weld gun 22. Also, the power source 28 and wire feed unit 26 are activated.

During welding, the particular welding parameter or parameters are monitored, step 104. As mentioned above, these parameters may include one or more of voltage, amperage, wire feed speed, gas flow rate, magnetic field strength, and the various visual characteristics. The data from the particular sensor or sensors is relayed in real time to the controller 62 where an algorithm determines if arc instability is detected, block 106. The controller 62 may employ algorithms in the neural network processor 60 to determine instability, which allows for learning and adjustments to occur within the processor itself. The algorithms employed will, of course, relate to the particular characteristic or characteristics being monitored.

If instability is detected, the flow rate and ratio of gasses from the gas sources 48, 54 is adjusted, block 108. This adjustment is accomplished by the controller 62 adjusting the first and second valves 40, 42. If the weld is not complete, block 110, then the monitoring continues. If the weld is complete, then the welding process ends, block 112.

While certain embodiments of the present invention have been described in detail, those familiar with the art to which this invention relates will recognize various alternative designs and embodiments for practicing the invention as defined by the following claims.

What is claimed is:

1. A method of controlling a mixture of arc shielding gas during an arc welding operation, the method comprising the steps of:
    (a) actuating a first valve connected to a first source of gas to selectively allow a first gas mixture to flow from the first source of gas into a mixing chamber and then into a weld gun;
    (b) actuating a second valve connected to a second source of gas to selectively allow a second gas mixture, which is different from the first gas mixture, to flow from the second source of gas into the mixing chamber and then into the weld gun;
    (c) conducting the arc welding operation;
    (d) monitoring at least one weld parameter to detect arc instability during the arc welding operation;
    (e) communicating the at least one weld parameter being monitored to a controller; and
    (f) during the arc welding operation, automatically actuating the first and second valves with the controller when arc instability is detected during the arc welding operation to adjust the first gas mixture flowing from the first source of gas and the second gas mixture flowing from the second source of gas, respectively.

2. The method of claim 1 wherein step (f) is further defined by the controller employing a neural network processor to determine arc instability is present based on the communicated at least one weld parameter.

3. The method of claim 1 wherein step (d) is further defined by the at least one weld parameter being a visually detectable parameter that is monitored by an optical sensor.

4. The method of claim 1 wherein step (d) is further defined by the at least one weld parameter being a magnetic field strength adjacent to a weld location.

5. The method of claim 1 wherein step (d) is further defined by the at least one weld parameter being at least two weld parameters, and step (e) is further defined by communicating the at least two weld parameters being monitored to the controller.

* * * * *